US008843290B2

(12) United States Patent
Kulik et al.

(10) Patent No.: US 8,843,290 B2
(45) Date of Patent: Sep. 23, 2014

(54) APPARATUS AND METHODS FOR CALIBRATING DYNAMIC PARAMETERS OF A VEHICLE NAVIGATION SYSTEM

(75) Inventors: Victor Kulik, San Jose, CA (US); Joseph Czompo, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 294 days.

(21) Appl. No.: 12/841,953

(22) Filed: Jul. 22, 2010

(65) Prior Publication Data

US 2012/0022780 A1    Jan. 26, 2012

(51) Int. Cl.
*B60T 7/12* (2006.01)
*G08G 1/123* (2006.01)
*G01S 19/00* (2010.01)
*G01C 25/00* (2006.01)
*G01C 22/02* (2006.01)
*G01C 21/28* (2006.01)

(52) U.S. Cl.
CPC ............ *G01C 25/00* (2013.01); *G01C 22/025* (2013.01); *G01C 21/28* (2013.01)
USPC ........................... 701/79; 340/988; 342/357.2

(58) Field of Classification Search
CPC ........ G01B 7/14; G01B 11/026; G01B 11/26; G01B 21/16; F16D 2500/3108; G01C 21/16; G01C 7/04; G01C 9/00; G01S 7/497; G01S 17/89; G01S 7/52004; H04N 1/00087; H04N 5/23267; B60R 21/015; F16H 2061/283; G05B 19/401; G05B 2219/37009; G05B 2219/37423; G05B 2219/39024; G05B 19/4015; G05B 2219/37067; G05B 2219/39007; G05B 2219/39045; G05B 2219/45045; G05B 2219/50026; B60Q 1/40; G01P 15/18; G02B 21/36
USPC ................. 701/1, 70, 79, 110, 409, 408, 412; 340/988, 990, 995.1–996; 342/357.2, 342/357.22, 357, 34, 106
See application file for complete search history.

(56) References Cited

U.S. PATENT DOCUMENTS 4,788,645 A    11/1988   Zavoli et al.
(Continued)

FOREIGN PATENT DOCUMENTS

EP    1162465 A1    12/2001
EP    1221586       7/2002
(Continued)

OTHER PUBLICATIONS

Iqbal et al., Experimental Results on an Integrated GPS and Multisensor Systemfor Land Vehicle Positioning, International Journal of Navigation and Observation, 2009, 1-19, vol. 2009, Article ID 765010, Hindawi Publishing Corporation.
(Continued)

*Primary Examiner* — Muhammad Shafi
(74) *Attorney, Agent, or Firm* — Shyam K. Parekh; Michael Johnson

(57) ABSTRACT

Apparatus and methods for calibrating dynamic parameters of a vehicle navigation system are presented. One method may include determining whether reference position data of a vehicle is available, and measuring composite accelerations of the vehicle. The method may further include generating distance and turn angle data based upon a wheel speed sensors data, computing distance and turn angle errors based upon the independent position data, and associating the distance and turn angle errors with composite accelerations. A second method presented includes calibrating an inertial navigation sensor within a vehicle navigation system. The second method may include determining reference position data and Inertial Navigation System (INS) data, aligning an IMU with the vehicle, and aligning the IMU with an Earth fixed coordinate system. The second method may further include computing the vehicle alignment with respect to a horizontal plane, and determining calibration parameters for distance sensors associated with the vehicle.

25 Claims, 8 Drawing Sheets

(56) References Cited

U.S. PATENT DOCUMENTS

| | | | |
|---|---|---|---|
| 5,067,082 A * | 11/1991 | Nimura et al. | 701/445 |
| 5,796,613 A | 8/1998 | Kato et al. | |
| 5,862,511 A | 1/1999 | Croyle et al. | |
| 5,912,635 A | 6/1999 | Oshizawa et al. | |
| 6,532,419 B1 | 3/2003 | Begin et al. | |
| 6,611,737 B1 * | 8/2003 | El-Tahan et al. | 701/21 |
| 6,631,321 B1 * | 10/2003 | Ciprian | 701/469 |
| 7,248,964 B2 | 7/2007 | Bye | |
| 2002/0022924 A1 | 2/2002 | Begin | |
| 2003/0163255 A1 | 8/2003 | Ishigami et al. | |
| 2004/0181320 A1 * | 9/2004 | Kane et al. | 701/19 |
| 2008/0208501 A1 | 8/2008 | Fiedler et al. | |
| 2009/0150075 A1 | 6/2009 | Watanabe et al. | |

FOREIGN PATENT DOCUMENTS

| | | |
|---|---|---|
| JP | H02208509 A | 8/1990 |
| JP | 2007108139 A | 4/2007 |
| JP | 2008224249 A | 9/2008 |
| JP | 2009139227 A | 6/2009 |

OTHER PUBLICATIONS

International Search Report and Written Opinion—PCT/US2011/045101—ISA/EPO—Nov. 17, 2011.

Partial International Search Report—PCT/US2011/045101—ISA/EPO—Sep. 28, 2011.

* cited by examiner

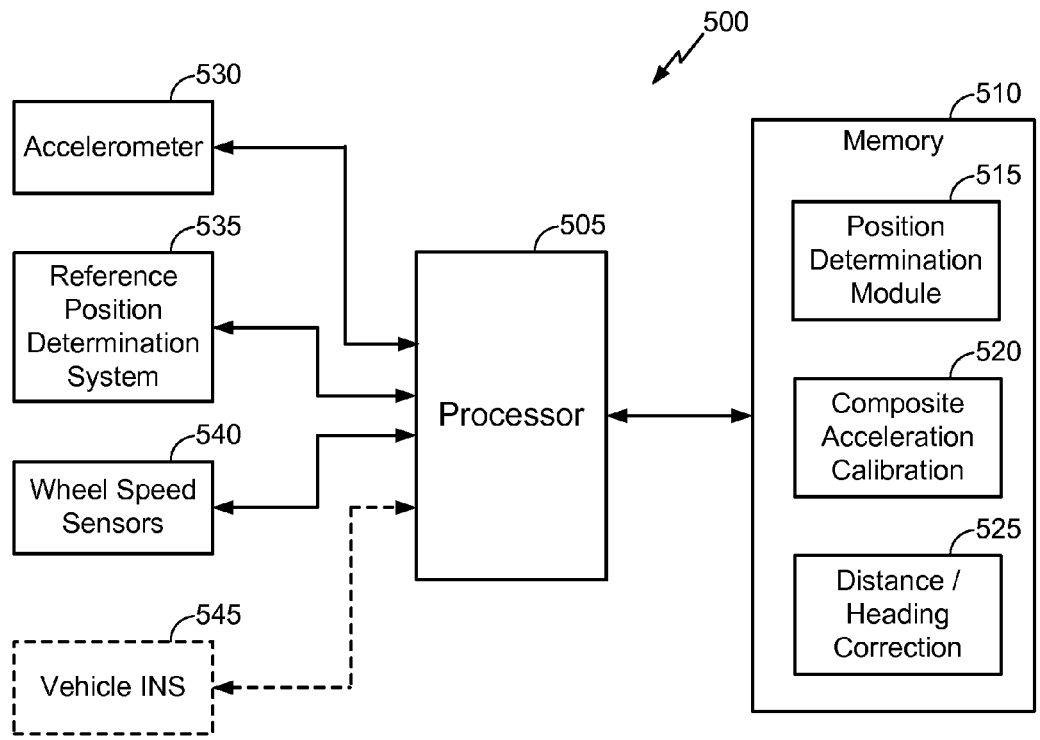
FIG. 5
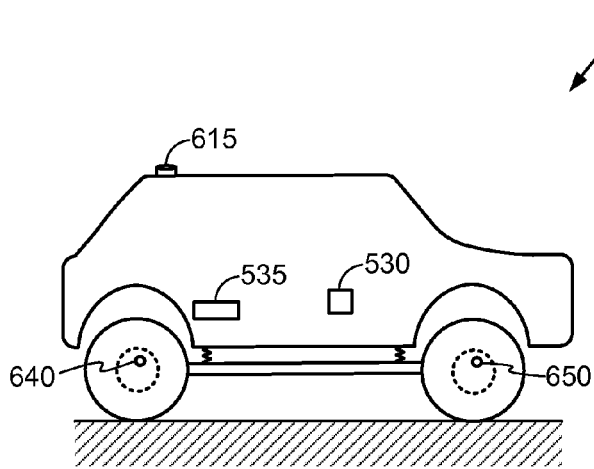
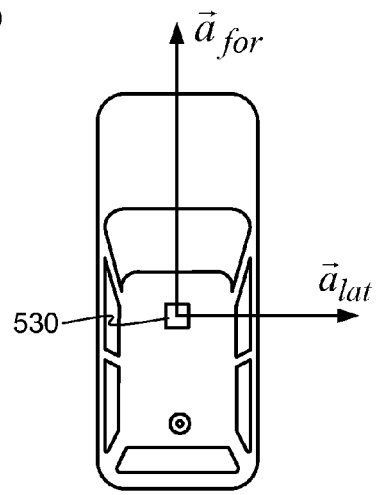
FIG. 6A  FIG. 6B

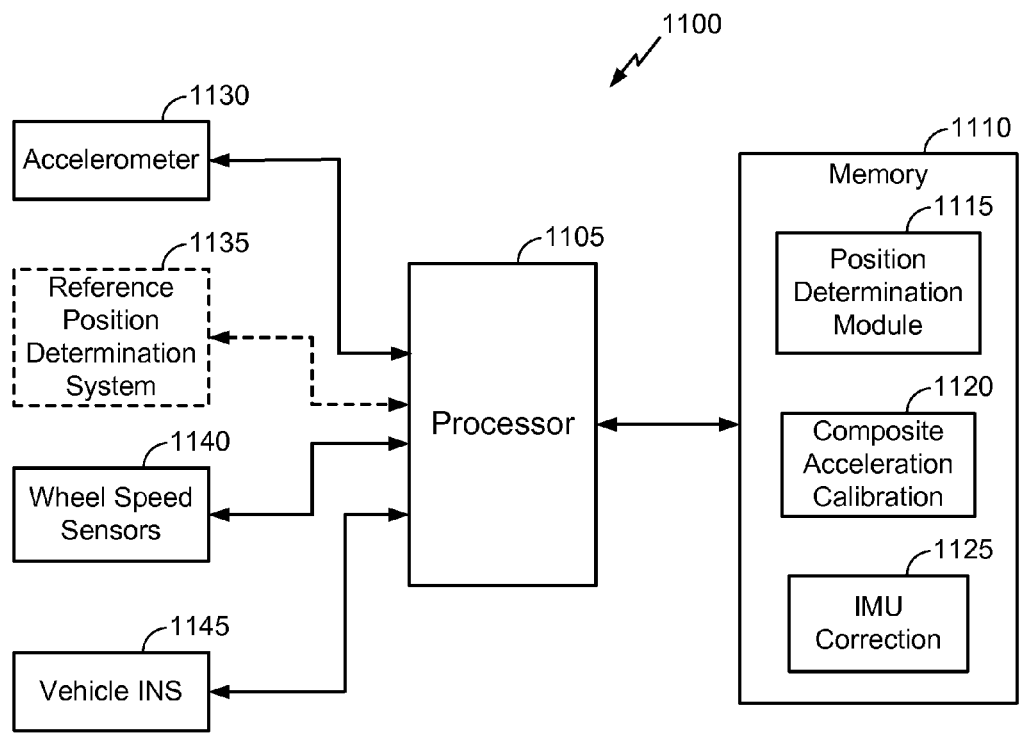
FIG. 11
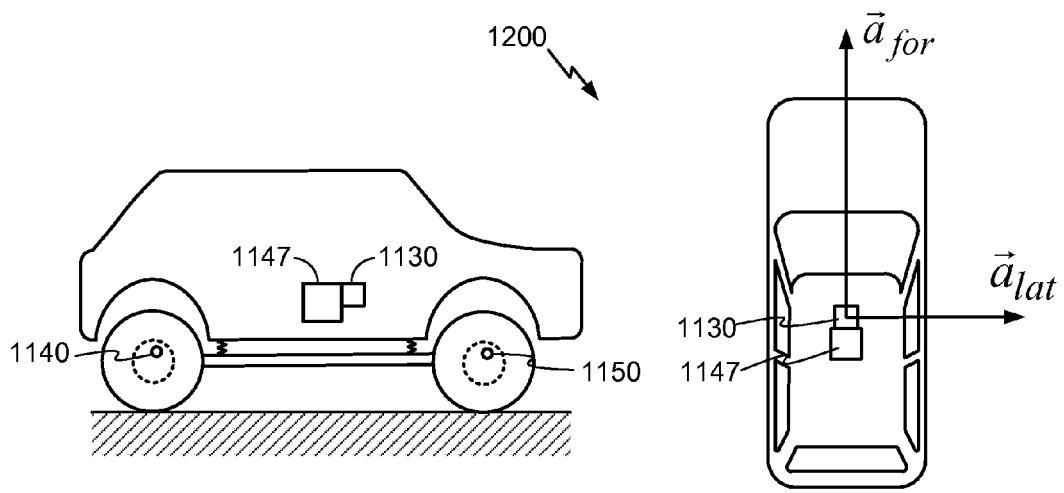
FIG. 12A  FIG. 12B

US 8,843,290 B2

APPARATUS AND METHODS FOR CALIBRATING DYNAMIC PARAMETERS OF A VEHICLE NAVIGATION SYSTEM

FIELD OF DISCLOSURE

Aspects of this disclosure generally relate to vehicle navigation systems, and more specifically, to improved vehicle navigation systems and methods which calibrate dynamic parameters associated with Dead Reckoning (DR) positioning.

BACKGROUND

Modern vehicle navigation systems may generate and display real-time positioning and direction information to assist drivers. Such systems can also provide critical location information for emergency service providers. Many modern vehicle navigation systems may use a combination of positioning systems in order to improve accuracy and robustness. For example, such systems may use sensor-based Dead Reckoning (DR) to bridge Global Positioning System (GPS) gaps. Dead Reckoning navigation systems may be based upon two general categories of sensors. The first category may include inertial motion sensors (IMUs), such as, for example, accelerometers and gyroscopes. Sensors in this category are not only useful in vehicle navigation systems, but may also be used in other vehicle sub-systems, such as stability control systems. The second category of sensors may include Wheel Speed Sensors (WSS) (also known as wheel tick sensors) and vehicle odometers. These sensors may be included in anti-lock brake systems for detecting wheel slippage and skidding. Both categories of sensors may produce data that can be accessed by the vehicle navigation system through a wired and/or wireless connection to the sensors themselves, or to the vehicle data bus containing sensor data.

Errors associated with DR position systems which may be difficult to mitigate are dynamic errors caused by the vehicle maneuvers and/or the vehicle riding on a non-horizontal surface. In these cases, due to the compound effect of the vehicle's suspension and tire elasticity, the vehicle body can rotate relative to the road surface causing inertial sensor misalignment and consequently the misinterpretation of their data. Tire elasticity by itself may cause yet another DR error because the wheel speed sensor and vehicle odometer signal's incorporation in the DR system typically needs accurate knowledge of each tire radius. Unknown changes in tire radii may result in errors in the computed travel distance and turn angle. In another vehicle application related to safety, WSS data may also be utilized for flat tire detection. When the tire radius, which may be calibrated using GPS, suddenly shrinks considerably, it may be an indication of a flat tire. As with DR positioning, the tire radii should be accurately known for a reliable results.

Depending on the road surface orientation (i.e., road profile) and vehicle maneuvers, the vehicle suspension may either roll to the side, or tilt nose up/down, or do both. This motion may typically be accompanied by the body rotation due to tire size change, so the total vehicle body orientation change will be the sum of both rotations due to suspension shift and tire deformation. As it was noted above, the tire radii change itself may be important for the wheel tick based DR and flat tire detection. Specific examples of these effects are illustrated in FIGS. 1-4 and described in more detail below.

FIG. 1 illustrates an example 100 of the vehicle dynamics associated with a left turn on traveling on a flat road surface. The rear of the vehicle 105 is illustrated, and shows the vehicle roll and tire deformation that occurs during this maneuver. During the left turn, the torque of the "inertial" centrifugal force about the center of mass 110 (vehicle mass times centripetal acceleration shown in FIG. 1 as $-m\vec{a}_{centr}$) causes the vehicle to roll to the right (passenger) side. This force causes the right tire 130 to compress relative to the left tire 125, and the right side of the suspension 120 to compress relative the left side of the suspension 115.

FIG. 2 illustrates an example 200 of the dynamics associated with the vehicle 105 traveling on a banked road surface. Again, the rear of the vehicle 105 is illustrated, and shows the vehicle tilting to the right side as it travels straight upon the banked road. The torque ($m\vec{g}$), caused by gravitational acceleration, will cause the vehicle to tilt, thus resulting in the right tire 130 compressing relative to left tire 125, and the right side of the suspension 120 compressing relative to the left side of the suspension 115. Accordingly, in both examples 100 and 200, the right wheel 130 radius will shrink and the left wheel 125 radius will increase, and the suspension will skew clockwise.

FIG. 3 illustrates an example 300 of the dynamics associated with the vehicle 105 accelerating forward on a flat road surface. The passenger side of the vehicle 105 is illustrated, and shows the vehicle pitch and tire deformation that occurs during this maneuver. Specifically, the forward acceleration causes the vehicle 105 to rotate nose up, increasing the load on the rear tires 330 to compensate for torque of the "inertial" force (vehicle mass times forward acceleration shown as $-m\vec{a}$ in FIG. 3). The inertial force ($-m\vec{a}$) will cause the rear suspension 315 to shrink and the front suspension 310 to expand, thus resulting in a skewed suspension creating a positive pitch rotation. This force will also cause the radii of both rear wheels 330 to shrink and the radii both front wheels 305 to expand, thus contributing the vehicle pitch rotation.

FIG. 4 illustrates an example 400 of the dynamics associated with the vehicle 105 traveling uphill along an inclined road surface. The inclination cause the vehicle to rotate about its center of mass 110, thus resulting causing a vehicle pitch and tire deformation similar to that described above in FIG. 3. Here, the force ($-m\vec{g}$) caused by gravitational acceleration results in rear suspension 315 shrinking and the front suspension 310 to expanding, thus again creating a positive pitch rotation. This force will also cause the radii of both rear wheels 330 to shrink and the radii both front wheels 305 to expand, thus again contributing the vehicle pitch rotation.

As can be seen from the above described examples, different types of vehicle maneuvers can result in various dynamic errors that can affect the accuracy of both WSS and IMU sensors. Because these errors can adversely affect the accuracy of DR positioning, it would be desirable to calibrate the data provided such sensors in order to improve the accuracy of the vehicle navigation system.

SUMMARY

Exemplary embodiments are directed to systems and method for calibrating dynamic parameters of a vehicle navigation system.

In one embodiment, a method for calibrating distance sensors within a vehicle navigation system is presented. The method may include, determining that reference position data of a vehicle is available, and measuring composite accelerations of the vehicle. The method may further include generating distance and turn angle data based upon a wheel speed sensors data, computing distance and turn angle errors based upon the independent position data, and associating the distance and turn angle errors with composite accelerations. In another embodiment, the method may further include determining distance and turn angle data using the wheel speed sensors, measuring composite forward and lateral accelerations, determining that calibration data is available, determining distance and turn angle corrections based upon measured composite accelerations, and applying distance and turn angle corrections to the distance and turn angle data.

In another embodiment, an apparatus for calibrating a distance sensor within a vehicle navigation system is presented. The apparatus may include an accelerometer, a reference position determination system, at least two wheel speed sensors, a processor coupled to the accelerometer; the at least two wheel speed sensors, and the reference position determination system, and a memory coupled to the processor. The memory stores instructions causing the processor to receive measured composite accelerations of the vehicle from the accelerometer, determine when the composite accelerations are substantially constant, compute distance and turn angle data based upon the wheel speed sensors, computing distance and turn angle errors based upon data provided by the independent position determination system, receive composite accelerations from the accelerometer, and associate the distance and turn angle errors with the composite accelerations.

In another embodiment, a method for calibrating an inertial navigation sensor within a vehicle navigation system is presented. The method may include determining reference position data and Inertial Navigation System (INS) data, and aligning an IMU with the vehicle. The method may further include aligning the IMU with an Earth fixed coordinate system, computing the vehicle alignment with respect to a horizontal plane, and determining calibration parameters for distance sensors associated with the vehicle.

In another embodiment, an apparatus for calibrating an inertial sensor within a navigation system residing within a vehicle is presented. The apparatus may include an accelerometer, at least two distance sensors, a vehicle inertial navigation system (INS) which includes an inertial measurement unit (IMU), a processor coupled to the accelerometer, the at least two distance sensors, and the INS. A memory coupled to the processor is also included, where the memory stores instructions causing the processor to determine reference position data and INS data and align the IMU with the vehicle. The instructions may further cause the processor to align the IMU with an Earth fixed coordinate system, compute the vehicle alignment with respect to a horizontal plane, determine calibration parameters for the at least two distance sensors, measure data using distance sensors, and apply calibration parameters to the measured distance data.

BRIEF DESCRIPTION OF THE DRAWINGS

The accompanying drawings are presented to aid in the description of the embodiments and are provided solely for illustration of the embodiments and not limitation thereof.

FIG. 5 is a block diagram showing an embodiment of a Wheel Speed Sensor (WSS) calibration and compensation system.

FIGS. 6A and 6B are diagrams exemplifying the vehicle placement of selected components used in the WSS calibration and compensation system shown in FIG. 6.

FIG. 11 is a block diagram showing an embodiment of an Inertial Measurement Unit (IMU) calibration and compensation system.

FIGS. 12A and 12B are diagrams exemplifying the vehicle placement of selected components used in the IMU calibration and compensation system shown in FIG. 11.

DETAILED DESCRIPTION

Figure 1:
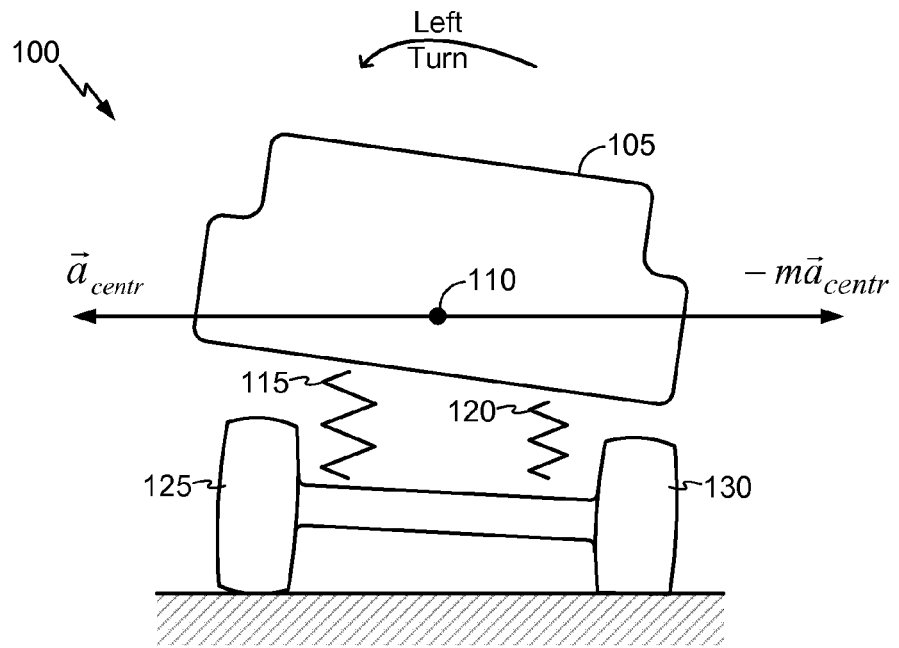
FIG. 1 is a drawing illustrating an example of the vehicle dynamics associated with a left turn on a flat road surface.
Figure 2:
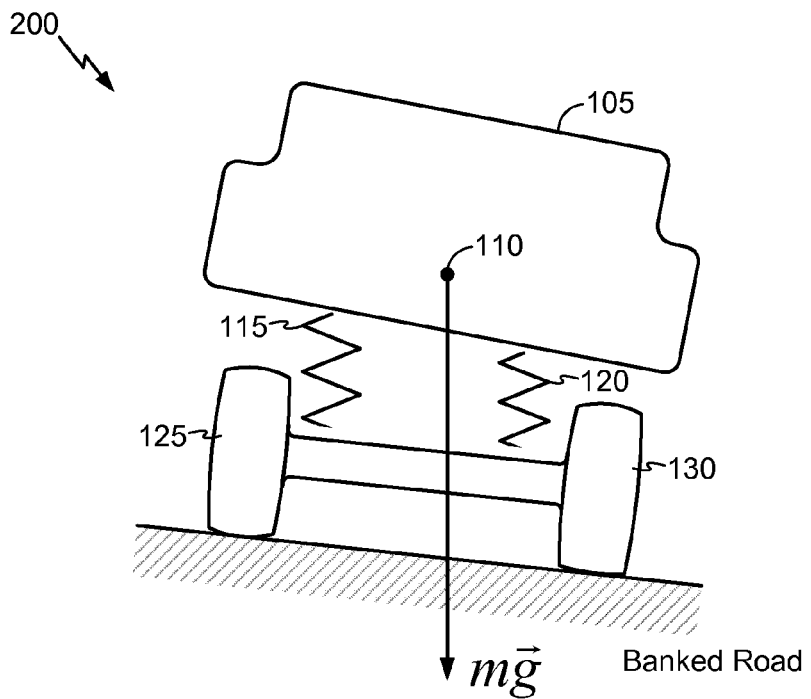
FIG. 2 is a drawing illustrating an example of the vehicle dynamics associated travel along a banked road surface.

Aspects of the embodiments are disclosed in the following description and related drawings directed to such embodiments. Alternate embodiments may be devised without departing from the scope of the invention. Additionally, well-known elements used and applied in the embodiments will not be described in detail or will be omitted so as not to obscure relevant details.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

As used herein, the term composite acceleration may be a measured quantity corresponding to the vector sum of the "inertial" force (as exemplified above) and the gravity force components. It should be realized that embodiments presented herein advantageously do not have to separate these components for performing IMU or WSS calibration, as both forces may have a common impact on the calibrated parameters.

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, various aspects may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Embodiments of the disclosure are directed to calibrating and compensating dynamic DR errors which include IMU error caused by the total vehicle body rotation, and WSS error caused by the tire radii change. In other embodiments, WSS calibration may also be used for flat tire detection.

The error calibration and compensation may be done with the use of an accelerometer located in a fixed position relative to the vehicle body. The accelerometer will measure the sum of both types of forces as set forth in the descriptions of FIGS. 1-4, that is, both "inertial" force due to vehicle acceleration and gravity force due to road and vehicle tilt. This is because the torque that causes vehicle body rotation and tire deformation, by definition, equals the force times it associated lever arm. In vehicle dynamics situations, the force components—gravity projection on the lateral or forward axis, and the inertial component—are applied to the vehicle center of mass, hence the lever arm will remain constant during the drive. Accordingly, the vehicle body rotation and tire deformation will depend on the total (gravity+inertial) force. In fact, in many cases the dependency may be straightforward: the body rotation and the tire deformation may be directly proportional to the force, though they do not have to be for purposes of the embodiments of the disclosure. However, the dynamic (inertial and gravity) forces components may be observable with the use of accelerometer, because they will cause the accelerometer excitation proportional to the total force. So the accelerometer will measure the cause of the vehicle body rotation and tire deformation that, in turn will cause the navigation system errors. Accordingly, calibrating the errors may be performed using the accelerometer signal.

Correcting the navigation errors caused by the dynamic forces may require knowledge of the accelerometer signal components in the vehicle body frame, that is forward (longitudinal) and lateral components. As will be discussed in more detail below, the forward accelerometer measurement relative to the vehicle frame may be used for the distance correction, and lateral accelerometer measurement may be used for the direction (turn angle) correction. Since the accelerometer may typically be mounted in vehicle in an arbitrary orientation, the sensor orientation should be known or calibrated in advance so that the lateral and forward acceleration components could be computed from the accelerometer's component axes. Such orientation calibration techniques are known in the art, and may depend on the availability of other sensors or a Satellite Positioning System (SPS) such as, for example GPS. Accordingly, details of the orientation calibration of the accelerometer need not be presented here.

Wheel Speed Sensor Calibration and Compensation

FIG. 5 is a block diagram showing an embodiment of a system 500 for WSS calibration and correction. System 500 may include a processor 505 and associated memory 510, an accelerometer 530, a reference position determination system 535, wheel speed sensors 540, and an optional vehicle Inertial Navigation System 545 (where the dotted lines indicate that it is optional in this embodiment).

The various subsystems and functions illustrated in the block diagram of FIG. 5 are shown as being connected together in a manner which is meant to represent that these various subsystems and functions are operatively coupled together. These interconnections may be dedicated and/or shared connections which can be implemented using different physical layers. For example, the data provided by the wheel speed sensors 540 can be provided to the processor via a wired and/or wireless connection to the sensors themselves, or to a vehicle data bus containing sensor data.

Those skilled in the art will recognize that other connections, mechanisms, features, functions, or the like, may be provided and adapted as necessary to operatively couple and configure the components and subsystems comprising the WSS calibration and correction system. Further, it is also recognized that one or more of the subsystems or functions illustrated in the example of FIG. 5 may be further subdivided, or two or more of the features or functions illustrated in FIG. 5 may be combined.

Further referring to FIG. 5, the processor 505 may utilize memory 510 to store program execution instructions and data. Memory 510 may be integrated into the processor 505 itself, may reside in a separate package interconnected using a system bus, or a combination of the two. Program instructions stored by memory 510 for execution by processor 505 may include a position determination module 515, a composite acceleration calibration module 520, and a distance/heading correction module 525. The composite acceleration calibration module 520 utilizes inputs provided by accelerometer 530, wheel speed sensors 540, and reference position determination system 535 to generate calibration information which may be used to correct subsequent data provided by the wheel speed sensors 540. Details explaining this functionality will be provided in subsequent portions of this disclosure. Optionally, a vehicle INS 545 may provide additional position and/or acceleration data which may be used to improve the accuracy and/or efficiency of the calibration process. The distance/heading correction module 525 may apply the calibration information to data produced by the wheel speed sensors 540. This can compensate the wheel speed sensor data for dynamic errors (e.g., tire radii variation) prior to using the data for dead reckoning positioning, thus improving the DR positioning accuracy.

The position determination module 515 may receive inputs from a variety of positioning subsystems to provide the most accurate position solution in all driving situations. In one embodiment, the position determination module 515 may blend inputs from the reference position determination system 535 and the compensated wheel speed sensor data. As will be described in more detail below, the reference position determination system 535 may be Satellite Position System (SPS) based. When SPS positioning signals are unavailable (due to, for example, obstructions in dense urban environments), DR positioning may be employed to fill in for SPS coverage gaps. Compensation of the WSS data by the distance/heading correction module 525 prior to use by the position determination module 515 can improve the accuracy when DR positioning is being employed. Additionally, in some embodiments, DR positioning may optionally combine WSS data with information provided by the vehicle INS 545.

Further referring to FIG. 5, accelerometer 530 can any type of conventional accelerometer which can measure at least two axes of acceleration. The accelerometer may be a dedicated unit, or an existing unit that may be used in the vehicle for other functionality. For example, accelerometers may be commonly found in stability control systems, and these may be used as the primary accelerometer, or in combination with an existing primary accelerometer 530 to improve acceleration accuracy. Moreover, accelerometers present in on-board INSs (e.g., optional vehicle INS 545) may also be used as a primary or supplemental accelerometers.

As mentioned above, the accelerations measured by accelerometer 530 may composite accelerations having both inertial and gravitational components. As shown in FIG. 6A, the accelerometer 530 may be mounted in the suspended portion of the vehicle 105, and should be oriented so that it can independently measure both forward acceleration ($\vec{a}_{for}$) and lateral acceleration ($\vec{a}_{lat}$) as shown in FIG. 6B. However, for WSS calibration, it is not critical if the accelerometer is attached to the vehicle body (suspended as shown in FIG. 6A) or to the vehicle frame or wheel axis (non-suspended), as long as the accelerometer 530 is firmly attached. For example, because of the suspension elasticity, the car body shown in FIGS. 1 and 2 will roll to right to a larger angle than the vehicle frame roll angle. Therefore, an accelerometer 530 placed on the vehicle body may produce a greater roll signal compared to an accelerometer 530 placed on the vehicle frame. However, the ratio between the accelerometer output and the wheels radii change may be accurately calibrated and corrected in either configuration, only the calibrated parameter values (like the ratio between the acceleration and the tire radius change) will differ depending on the accelerometer placement.

The WSS calibration and correction system 500 may also improve navigation accuracy in the (less frequent) case of the mass re-distribution in the vehicle during Dead Reckoning, such as a passenger moving from left to right on the back seat in the middle of DR. As a result of the motion the vehicle will roll to the right, the accelerometer can sense this motion, and the WSS system 500 will calculate a sensor misalignment correction, along with the WSS correction due to the reduced size of the right tire. However, in this case the results could be less accurate than those with the gravity/inertial forces, because the WSS calibration system will use the old calibration parameters that could be a bit off, because they were measured earlier for different mass distribution (that affect the vehicle dynamics).

The reference position determination system 535 may provide accurate position information to the processor 505 which can be used as a "reference" position for computing distance and turn angle errors in the composite acceleration calibration module 520. The reference position determination system 535 may be a Satellite Positioning System (SPS) and/or a map matching system. When this system utilizes an SPS, it may utilize a receiver that extracts position, using conventional techniques, from a plurality of signals transmitted by SPS satellites 102. As shown in FIG. 6A, the SPS unit 535 may be placed in the vehicle, and can receive signals using an externally mounted antenna 615 and/or an internal antenna (not shown).

The WSS calibration and correction system 500 described herein may be used with various satellite positioning systems, which typically include a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Furthermore, the reference position determination system 535 may be used with positioning determination systems that utilize pseudolites or a combination of satellites and pseudolites. Pseudolites are ground-based transmitters that broadcast a PN code or other ranging code (similar to a GPS or CDMA cellular signal) modulated on an L-band (or other frequency) carrier signal, which may be synchronized with GPS time. Each such transmitter may be assigned a unique PN code so as to permit identification by a remote receiver. Pseudolites are useful in situations where GPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals", as used herein, is intended to include SPS-like signals from pseudolites or equivalents of pseudolites.

As mentioned above, the reference position determination system 535 may also use a map matching system. Here, a road network and/or coordinates in standard reference frame which may be stored in a map database to calculate vehicle positions. Distance and heading information may be provided to perform map matching, and map matching may calculate the current position based on the road network and the stored data. The reference position determination system may utilize SPS and/or map matching techniques, in addition any other form of position determination which may be combined to improve the accuracy of the reference position solution. Standard map matching may be used, which includes assigning SPS and/or DR position estimates to a roadway on a map.

Further referring to FIG. 5, WSS calibration and correction system 500 may include Wheel Speed Sensors 540 which may provide a signal to the processor 505 indicative of wheel speed and/or wheel revolution counts (such as, for example, in wheel tick sensors). As shown in FIG. 6A, rear wheel speed sensors 640 may be used to provide independent data regarding each rear tire, so that processor 505 may calculate both distance traveled and turn angle for use in DR positioning. Moreover, front wheel speed sensors 650 may also be used in place of real wheel sensors 640, or in addition thereto. Each wheel speed sensor may be any type of known sensor that can directly measure wheel speed (e.g., reluctance/magnetic flux sensors) and/or provide a rotation counter value (e.g., Hall Effect sensors). As will be presented in detail below, the accuracy of information derived from the wheel speed sensors can adversely affected by unknown variations in wheel radii. Specifically, the errors may be proportional to changes in tire radius (delta tire radius, and thus to the traveled distance. These errors may be compensated for using the following techniques presented below.

In various embodiments, data from the left and right non-turning (rear) wheels collected from sensors 640 may be used for navigation. For ease of explanation, the formulae below are derived with this configuration in mind. However, other embodiments may also utilize front sensors 650, in addition or as a replacement to, rear wheel sensors 640. It should be understood that these equations could be easily expanded to the case when data from all four wheels are available to the WSS calibration and compensation system 500.

When the wheel rotates, the WSS 540 may (depending upon the sensor type) output a fixed number of ticks (pulses) per wheel revolution. The wheel traveled distance can be computed as $$D = Cnt * 2 * Pi * R/N \quad (1)$$

where Cnt is number of WSS ticks, R is the wheel radius (tire size), and N is the number of ticks per wheel revolution.

When both left and right wheel speed sensors data are available, they may be used to compute vehicle distance and vehicle heading change that may be expressed using the following equations.

The average distance from the left and right wheel tick sensors gives an estimate of the vehicle traveled distance $$VehicleDist = (D\_left + D\_right)/2 \quad (2)$$

where D_left and D_right are distances traveled by the left and right wheel, respectively, computed by formula (I). The vehicle distance per second gives vehicle speed.

The Delta distance between the left and right wheels gives an estimate of the vehicle change in heading $\Delta\theta$ as $$\Delta\theta = (D\_left - D\_right)/T \quad (3)$$

where T is the distance between the two wheels (e.g. the wheel track). The change in heading per second gives vehicle turn rate.

Major sources of the computed wheel distance error in formula (I) may include inaccurate WSS output, and wheel radius uncertainty. Inaccurate wheel sensor output count Cnt (e.g., number of ticks) may be caused by wheel slippage or skidding, sensor noise and quantization error, and/or sensor dead-band with certain types of WSS not detecting wheel rotation below certain speed level. Wheel radius R uncertainty is typically caused by the wheel radius (tire size) variations over time. The wheel radius change may occur due temperature, altitude, air pressure change, and/or tread wear. In most cases (excepting the case of a flat tire) these changes are relatively slow and can be calibrated when SPS positioning data is available. As described above, faster changes in the tire size may occur due to the dynamic left/right or forward/rear wheel load re-distribution when the vehicle is accelerating, turning or riding on a non-horizontal road.

Embodiments presented herein may focus on the WSS-based vehicle distance and delta heading dynamic errors due to mentioned above wheels radii uncertainty caused by the vehicle maneuvering and road profile change. Equations relating the wheels radii effect on the speed and heading accuracy can be derived as follows.

Per equation (1), left and right wheel distances D_left and D_right can be computed as $$D\_left = CntL * 2 * Pi * RL\_Asm/N$$

$$D\_right = CntR * 2 * Pi * RR\_Asm/N, \quad (5)$$

where RL_Asm and RR_Asm are assumed values of the wheels radii that can be expressed as $$RL\_Asm = RL\_True + RL\_Err; \quad (6)$$

$$RR\_Asm = RR\_True + RR\_Err. \quad (7)$$

If the radii have shrunk but have not been recalibrated yet, RL_Err and RR_Err will be positive, because RL_Asm and RR_Asm will be remain equal to old bigger radii values, despite that the new RL_True and RR_True will be now smaller.

Per equations (2), (3), (6) and (7) presented above, the estimated vehicle distance will be computed as $$Dist\_Est = (CntL * 2 * Pi * (RL\_True + RL\_Err)/N + CntR * 2 * Pi * (RR\_True + RR\_Err)/N)/2. \quad (8)$$

The delta heading can be expressed as $$\Delta\theta\_Est = (CntL * 2 * Pi * (RL\_True + RL\_Err)/N - CntR * 2 * Pi * *(RR\_True + RR\_Err)/N)/T. \quad (9)$$

As Equations (8) and (9) show, the vehicle distance and delta heading errors due to wheel radii errors can be expressed as $$Dist\_Err = (CntL * 2 * Pi * RL\_Err/N + CntR * 2 * Pi * RR\_Err/N)/2 \quad (10)$$

$$\Delta\theta\_Err = (CntL * 2 * Pi * RL\_Err/N - CntR * 2 * Pi * RR\_Err/N)/T \quad (11)$$

Assuming the wheel radii were accurately calibrated (for example, from reference position data such as, for example, SPS data) when the vehicle was moving straight on a horizontal road. If SPS the signal was subsequently lost and WSS could no longer be recalibrated, any (unknown to the system) radii change will result in the distance and delta heading errors.

Below we will analyze how the wheel radii may change dynamically due to different vehicle maneuvers or road profile changes, and how this can affect computed vehicle distance and delta heading data during DR positioning. As noted above, for the sake of simplicity this description will focus on the rear wheel WSS equations, and thus the discussion will concentrate on rear wheel radii changes. However, if front wheel WSS data are available, the radii of these wheels may be affected similarly.

Uphill/Downhill Motion or Acceleration/Deceleration

Figure 3:
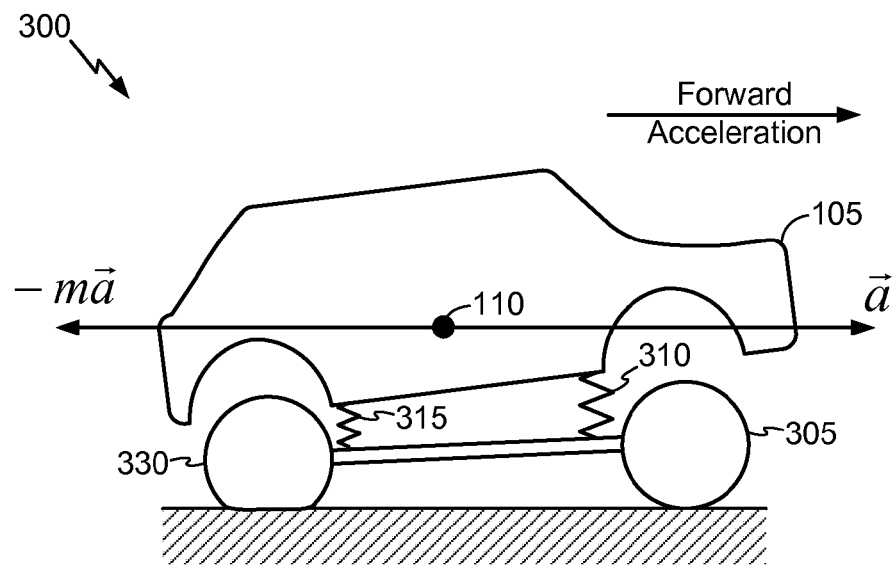
FIG. 3 is a drawing illustrating an example of the vehicle dynamics associated forward acceleration.
Figure 4:
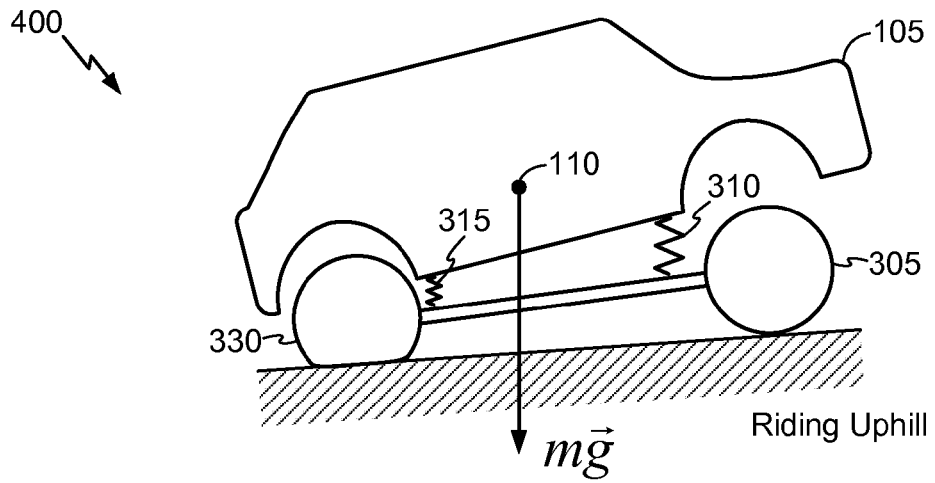
FIG. 4 is a drawing illustrating an example of the vehicle dynamics associated travel along an inclined road surface.

When the vehicle 105 rides uphill or accelerates forward as shown in FIGS. 3 and 4, both rear tires may shrink due to increased wheels load. For simplicity in may be assumed that the left and right tires radii were originally equal on the straight horizontal road, and that they will now shrink by the same amount, and denote this amount as AR:

$$RL\_Err = RR\_Err = \Delta R.$$

The distance error (10) can be expressed as $$Dist\_Err = Pi/N * (CntL + CntR) * \Delta R \quad (12)$$

As it was explained above, $\Delta R$ will be positive in this case, so the distance will be overestimated.

The Delta heading error can be expressed in this case $$\Delta\theta\_Err = 2 * Pi/N/T * (CntL - CntR) * \Delta R. \quad (13)$$

Due to assumed equal original radii as well as $\Delta R$ for both left and right wheels, CntL will be equal to CntR for the straight moving vehicle, so delta heading error caused by driving up/down hill or accelerating/decelerating will be close to zero.

Turn or Banked (Crowned) Road

When the vehicle turns left on a horizontal road or rides straight on a road banked to right (a shown in FIGS. 1 and 2), the load on the right wheel may increase. The right tire radius may shrink (RR_Err>0), and the left tire radius may increase (RL_Err<0). Assuming RL_Err=−RR_Err and denoting $$RR\_Err = -RL\_Err = \Delta R,$$

equation (10) shows that the distance error, proportional to the turn angle will be low. At the same time from Equation (11), we can see that delta heading error will be proportional to the traveled distance thus may be significant $$\Delta\theta\_Err = 2*Pi/N/T*(CntL+CntR)*\Delta R. \tag{15}$$

The computed delta heading may be overestimated in this case because computed D_right may be too large and D_left may be too small. This is because the (smaller) right wheel will perform more rotations on the same distance and its WSS will output greater tick count, but this count will be multiplied by the (old) too large RR in (1). Likewise, the (bigger) left wheel will perform less rotations on the same distance and its WSS will output smaller tick count, but this count will be multiplied in (1) by the (old) too small RL.

Figure 9:
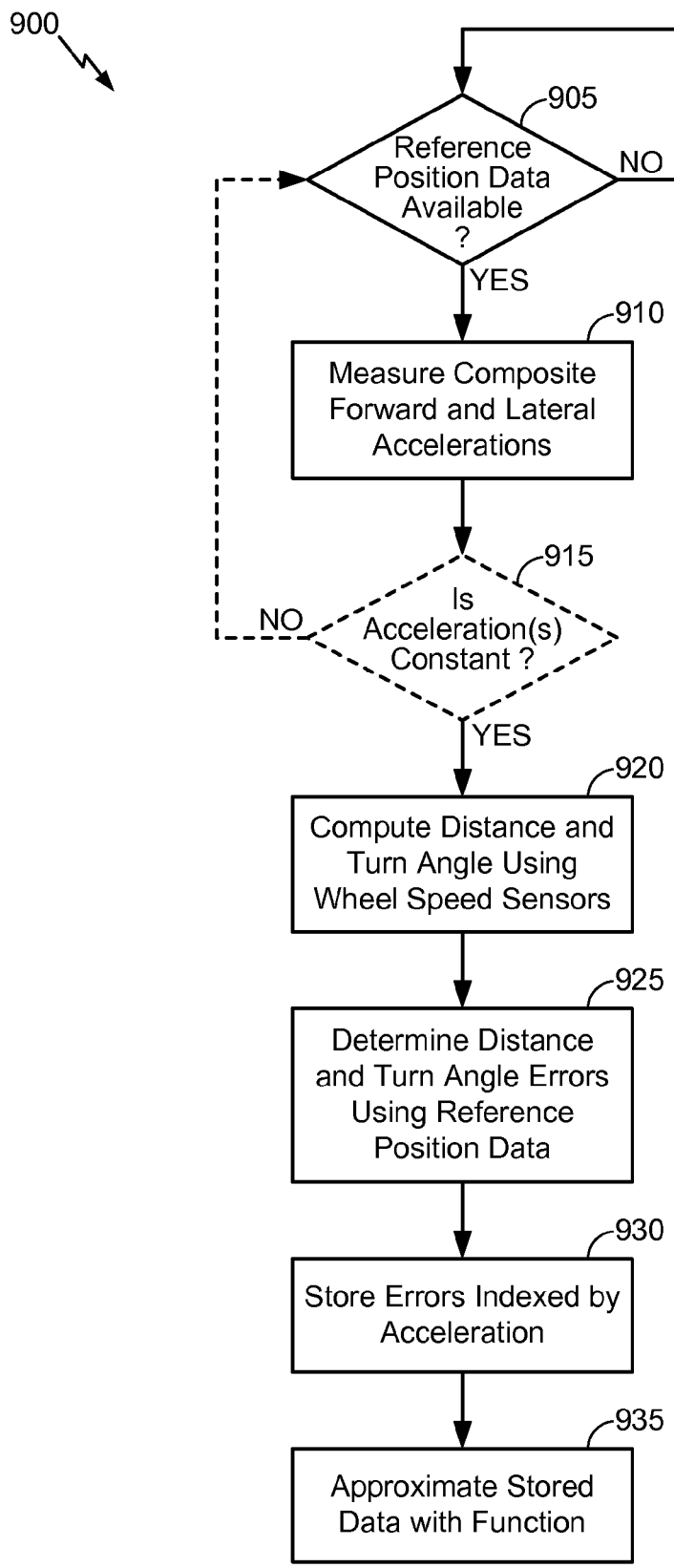
FIG. 9 is a flowchart illustrating an exemplary WSS calibration process.
Figure 10:
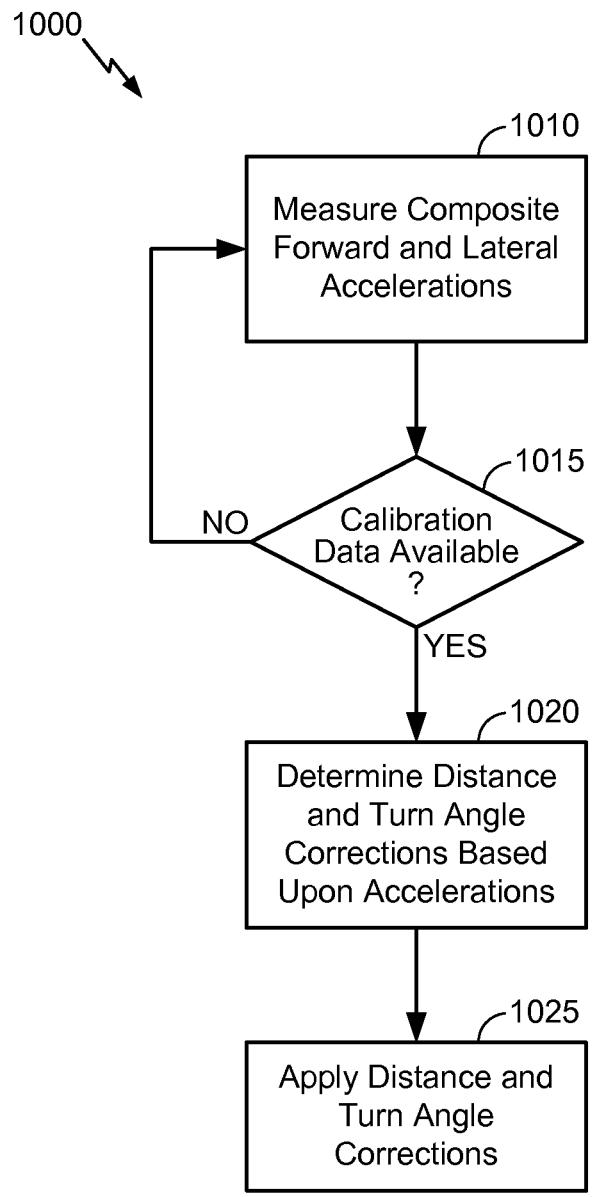
FIG. 10 is a flowchart illustrating an exemplary WSS compensation process.

In subsequent portions of the disclosure describing the flow charts in FIGS. 9 and 10, the above analysis will be used as a reference to describe exemplary WSS calibration and compensation processes.

Figure 7:
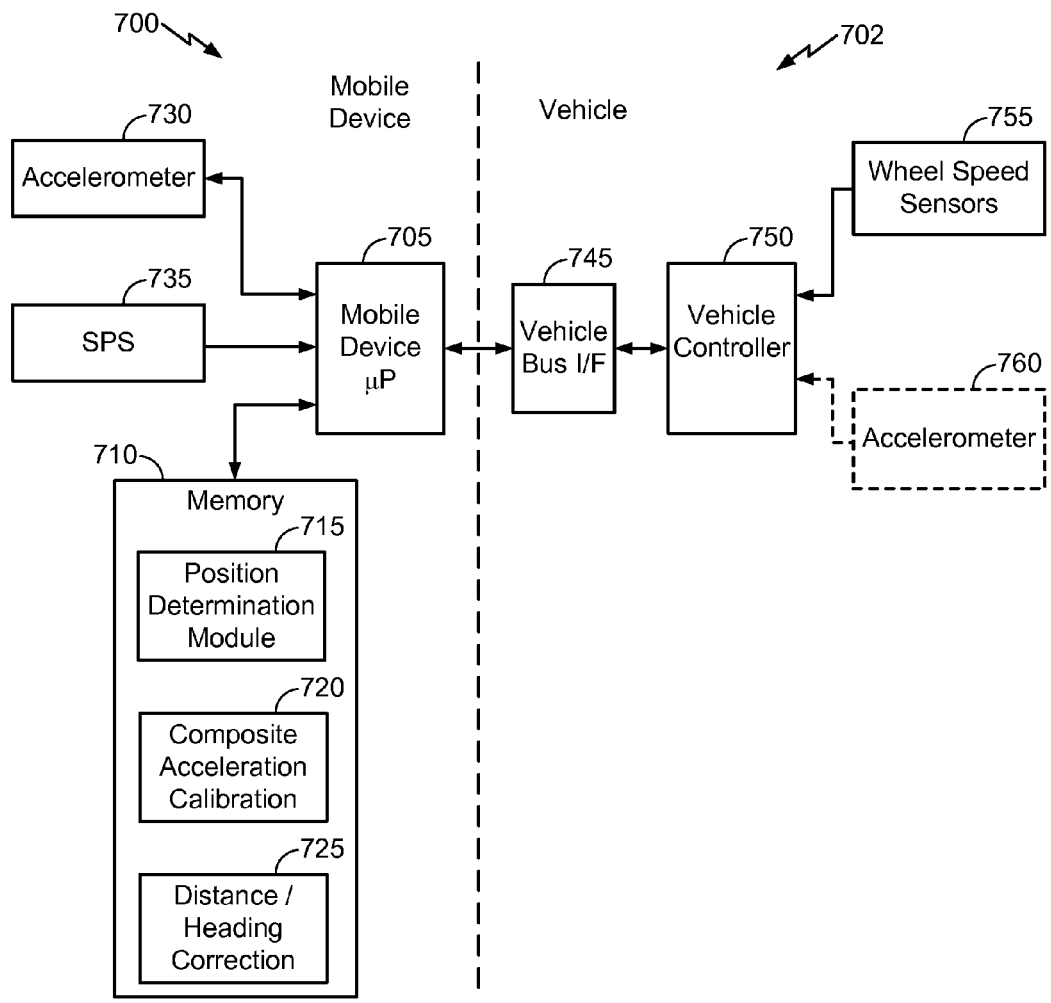
FIG. 7 is a block diagram showing an embodiment of a Wheel Speed Sensor (WSS) calibration and compensation system implemented within a mobile device.

FIG. 7 is a block diagram showing an embodiment of a Wheel Speed Sensor (WSS) calibration and compensation system 700 implemented within a mobile device 700. Many modern mobile devices may utilize GPS and accelerometers to provide additional features and functions to their users. This functionality may be advantageously used to perform WSS calibration and compensation in less expensive vehicles that may lack sophisticated factory installed navigation systems. In this embodiment, the mobile device may provide navigation information in a traditional manner using an SPS. If SPS signals become unavailable, or their accuracy becomes degraded, the mobile phone may use DR positioning to fill in the SPS gaps. In order to improve DR positioning, the mobile device may implement WSS calibration and compensation.

In this embodiment, the mobile device 700 may include a processor 705 and associated memory 710, an SPS 735, and an accelerometer 730. The functionality of these components may be similar to the previously described processor 605 and associated memory 610, the reference position determination system 535, and the accelerometer 530, respectively, and thus their descriptions need not be repeated here.

The mobile device processor 705 may interface to the vehicle controller 750 through a standard vehicle interface 745. Through this interface 745, the mobile device 700 may have access to various vehicle 700 data flows produced by the wheel speed sensors 755, and, optionally, vehicle accelerometer 760 (if an accelerometer is available). Because most modern vehicles come equipped with anti-lock brakes as standard equipment, wheel speed sensors 755 are likely to be present and available for use.

Figure 8A:
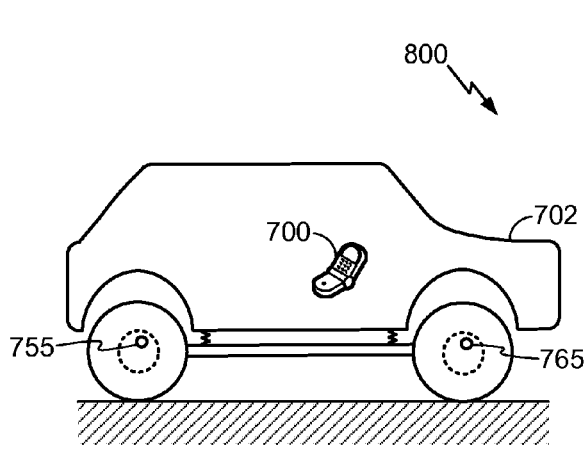
FIGS. 8A and 8B are diagrams exemplifying the vehicle placement of selected components used in the WSS calibration and compensation system shown in FIG. 7.
Figure 8B:
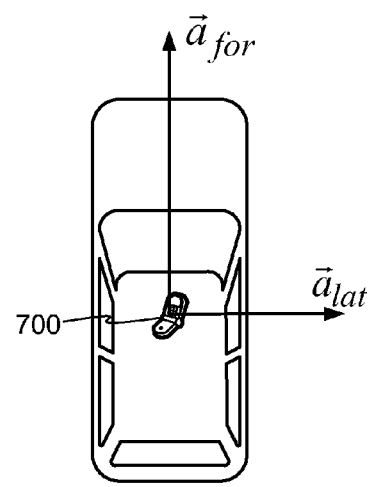

As shown in FIG. 8A, the mobile device 700 may be placed in the interior of vehicle 702 so its display is visible to the driver. The mobile device may be attached to the vehicle in a fixed orientation using a cradle (not shown) providing a connection to the vehicle interface 745. The mobile device will have access to the data produced by WSS 755 and/or WSS 765. As shown in FIG. 8B, the orientation of the mobile phone may be calibrated using known techniques so that it may sense forward acceleration ($\vec{a}_{for}$) and lateral acceleration ($\vec{a}_{lat}$). Alternatively, if a stability system is present, an optional vehicle accelerometer 760 may be used to measure the accelerations in place of accelerometer 730, or be used in combination thereof to improve the acceleration measurements.

As used herein, mobile station 700 may be any portable or movable wireless device or machine that is configurable to acquire wireless signals transmitted from, and transmit wireless signals to, one or more wireless communication devices or networks. Thus, by way of example but not limitation, mobile device 700 may include a radio device, a cellular telephone device, a computing device, a personal communication system (PCS) device, or other like movable wireless communication equipped device, appliance, or machine. The term "mobile station" may also intended to include devices which communicate with a personal navigation device (PND), such as by short-range wireless, infrared, wire line connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile station."

As used herein, the term "wireless device" may refer to any type of wireless communication device which may transfer information over a network and also have position determination and/or navigation functionality. The wireless device may be any cellular mobile terminal, personal communication system (PCS) device, personal navigation device, laptop, personal digital assistant, or any other suitable mobile device capable of receiving and processing network and/or SPS signals.

The term "network" and "system" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16) and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN.

From the inspection of Eqns. (12)-(15), the error in the distance (Eqn. 2) and the error in turn angle (Eqn. 3) derived from the WSS due to vehicle maneuvers or road profile change will be proportional to: i) the tire radius change ΔR caused by the "inertial" or gravity force torque; and ii) the traveled distance. As it was explained above, the accelerometer can be used as an (indirect) measurement of the tire deformation ΔR. On the other hand, the traveled distance can be estimated with good accuracy with the (even non-corrected) wheel tick sensor using Eqn. (2). In order to improve DR positioning, the WSS correction algorithm may include two phases: 1) the navigation error calibration phase; and 2) the navigation error compensation phase. As provided below, the explanation of FIG. 9 describes an embodiment for WSS calibration, and explanation of FIG. 10 describes an embodiment for WSS compensation.

During the calibration phase, distance errors (Eqn. 2) and turn angle errors (Eqn. 3) may be determined based upon measured reference position data. The composite forward and lateral accelerations associated with these errors may be measured. The ratio between the distance error or/and turn angle error and the traveled distance may be saved along with the forward and lateral acceleration components in a lookup table. The error/distance ratio units may be meters per meter for the wheel tick distance error, and degrees per meter for the turn angle error. When the dependency of the errors from the accelerometer signals within the table is slowly varying (i.e., smooth), they may be approximated with a simple function. Such a functional approximation may be performed to simplify the table usage, improve execution time and reduce round-off errors.

In more detail, FIG. 9 is a flow chart illustrating an exemplary WSS calibration process 900. Portions of this process may be executed, for example, on the processor 505 executing instructions stored in memory 510, including instructions which are associated with the composite acceleration calibration module 520. The method 900 may initially determine whether reference position data (e.g., SPS and/or map matching) is available (905). For example, SPS signals may not be available due to building obstructions. If such position data is not available, the calibration process cannot continue, and will loop back until reference position information becomes available. Accelerometer 530 may measure composite forward acceleration and composite lateral acceleration (910). In one embodiment, intervals of acceleration may be selected which are approximately constant, so a determination may optionally be performed to test this constraint (915; shown in dashed lines as its optional). If the measured accelerations are not constant, the process may loop back to (905) to take another set of measurements. If the accelerations are constant, the method may then compute distance and turn angle using data obtained from WSS sensors 540 (920). These values may be computed using standard WSS Eqns. (2) and (3).

In another embodiment, the constraint regarding constant acceleration need not be imposed. As described above, the distance and turn angle error typically depend on the sum of the inertial and gravity forces that cause the acceleration excitation in the accelerometer. Barring accelerometer non-linearity, the relation to acceleration and force may be thought of as linear, based upon the sensitivity of the accelerometer. In other words: Accel=Sensitivity*Force. However, the accelerometer behavior may be generalized into both linear and non-linear descriptions.

Linear Assumption

Here, the Distance Error and/or Turn Angle Error may be directly proportional to the input force. This may be mathematically described as:

$$\text{Dist\_Err} = \text{Constant} * \text{Force} = C / \text{Sensitivity} * \text{Accel}.$$

In this instance, the constraint for constant acceleration is not required for calibration. The signal provided from the accelerometer may be averaged even when it is not constant, then measure distance (from GPS or WSS), measure errors (from GPS), and correlate Dist_Err, Turn Angle Error, and measured acceleration.

Non-Linear Assumption

Here, the Distance Error and/or Turn Angle Error may not be directly proportional to the input force. In this case, the relationship between the error and the force may be a non-linear, monotonic function. In this instance, lookup tables relating Distance and Turn Angle Error may be determined so to adequately approximate the underling non-linear function. This function may or may not subsequently be approximated using a non-linear approximation, and/or piecemeal linear approximation techniques, in order to improve algorithm execution speed.

In general, the calibration approach need not make any assumptions, so the algorithm may be configured to determine, for a particular vehicle, whether the Distance and/or Turn Angle Errors are indeed proportional to Force (and thus, the input accelerations). Based upon this determination, the appropriate constraint may be applied which can make the calibration faster and/or more accurate (because the algorithm will not have to loop back and wait for constant acceleration). Alternatively, the algorithm can be pre-configured depending on the vehicle type to assume a particular behavior, or not make any such assumptions.

Further referring to FIG. 9, the distance and turn angle errors may next be computed based upon the data provided by the reference position determination system 535 (925). Specifically, for example, distance and turn angle may be directly computed using SPS data corresponding to the same time interval. The SPS computed data may be subtracted from the WSS distance and turn angle measurements to determine the error over the time interval. The ratio between errors and the traveled distance may be computed, and then stored in memory 510 in a look-up table. The lookup table may be indexed by each accelerometer component (930). If a table entry already contains the error/distance ratio for the current value of the acceleration, the new error/distance ratio may be averaged with the previous one for better accuracy. On a periodic basis, the contents of the table may be approximated with a function (935). In one embodiment, the function may be a linear function of the wheel tick sensor error of the acceleration. Once the calibration phase 900 is complete, the result may be used to compensate WSS data to improve DR positioning accuracy.

FIG. 10 illustrates a flowchart of an embodiment of a process for performing WSS compensation 1000. The process may start by measuring the composite forward and lateral accelerations (1010). The measured forward acceleration may be used for the distance correction, and the measured lateral acceleration may be used for the turn angle correction. The processor may perform a check to determine if calibration data is available which corresponds to the measured accelerations (1015). If so, using the appropriate accelerations, the ratios between the errors and the traveled distance may be determined directly from the look-up table, or using an approximated formula (1020). The compensation may performed by computing the WSS correction as the ratios times traveled distance on the segment of interest (for example, when DR positioning is being performed), where the traveled distance may be computed from Eqn. (2).

The WSS calibration and correction process describe above may improve over conventional methods by compensating for errors due to the lateral gravity component caused by the vehicle roll (on the turn or otherwise). Accordingly, conventional approaches may not work on a banked road during a turn, or on the straight road having a crown. The WSS approach described above for FIGS. 9 and 10 can accurately measure the combination of the gravity component and the inertial force which causes vehicle roll, and based on the calibration results, compute delta heading correction proportional to distance and $\Delta R$ according to Eqn. (15). Moreover, conventional systems may only address delta heading errors, and do not address the vehicle distance errors.

Moreover, accurate wheel tick sensor error calibration can also improve flat tire detection sensitivity. In conventional systems, the increased wheel tick sensor error due to flat tire may be detected when SPS data is available, by observing discrepancy between the delta heading computed from GPS, and from WSS. However, as seen from the above description, the sources of the WSS heading error are not restricted to effects associated with flat tires, but are also influence by the inertial and/or gravity forces due to vehicle turn and/or road profile that would also cause dynamic variations in tire radii. The GPS/WSS delta heading discrepancy may have multiple components, and for the flat tire detection purposes, the tire radius decrease due decreased tire pressure may be thought of as a "signal." The dynamic variations in tire radii due to dynamic forces may be considered a "noise" component. In conventional systems, these signal and noise component are inseparable, so the heading error threshold has to be chosen coarsely, thus making the flat tire detection unreliable. In the embodiments provided above, the dynamic portion of the delta heading error will be calibrated and compensated, and if after the compensation the heading discrepancy still persists, it will likely be caused by a flat tire. Accordingly, for the embodiments presented herein, the heading error threshold can be more finely tuned, and the flat-tire detection sensitivity will thus be increased.

Inertial Measurement Unit (IMU) Calibration and Compensation

As mentioned above, lateral or forward accelerations, or changes in the direction of gravity as encountered when traveling along banked roads, may cause the vehicle body to tilt around the roll and/or pitch axes. This motion may cause the sensor frame of an inertial navigation system to change orientation with respect to the road. When an IMU contains less than 6 axes, for example, it is comprised only of 3-axis accelerometer or/and yaw gyro, the sensor reference frame orientation relative to the road should be accurately known to correctly convert inertial sensor measurements into vehicle speed and direction. Even for a complete 6-axis INU the (non-calibrated) vehicle body misalignment with the road may cause a problem, though less fundamental. Namely, it would cause the so-called non-holonomic constraints (NHC) to break, which would be otherwise very useful in keeping velocity errors (and, respectively, position errors) down.

When a combined GNSS/IMU position/velocity solution is available, the vehicle body rotation can be calibrated as a function of accelerometer measurements that measure the accelerations and gravity vector changes as described above.

One calibration method in the 6-axis INS could be to correlate acceleration measurements with body rotation angle changes computed from gyro data. Once calibrated, the vehicle tilt angle computed from accelerometer measurements can be used to correct for errors in the NHC, by creating a vehicle tilt corrected "road" coordinate frame in which the NHC is valid. This will greatly increase the 6-axis INS positioning accuracy. In case of the "gyro-less" IMU, the accelerometer axes projections to the coordinate frame aligned with the road will be calibrated in our system not as constant cosine values (as would've been done in the prior art system), but rather as functions of the forward and lateral accelerations themselves, to account for the vehicle body rotation due to the gravity/inertial forces.

Vehicle navigation systems containing reference position determination systems, such as SPS and/or map matching systems, and accelerometer in a fixed orientation relative to the vehicle reference frame, where the vehicle body rotation angle relative to the road is calibrated as a function of the accelerometer signal, and then the calibrated parameters in combination with the accelerometer signal are used to improve system performance (position, velocity and other navigation parameters accuracy and reliability).

FIG. 11 is a block diagram showing an embodiment of an Inertial Measurement Unit (IMU) calibration and compensation system 1100. System 1100 may include a processor 1105 and associated memory 1110, an accelerometer 1130, a vehicle Inertial Navigation System 1145 wheel speed sensors 540, and an optional reference position determination system 1135 indicated in dotted lines.

The various subsystems and functions illustrated in the block diagram of FIG. 11 are shown as being connected together in a manner which is meant to represent that these various subsystems and functions are operatively coupled together. These interconnections may dedicated and/or shared connections which can be implemented using different physical layers.

Those skilled in the art will recognize that other connections, mechanisms, features, functions, or the like, may be provided and adapted as necessary to operatively couple and configure the components and subsystems comprising the WSS calibration and correction system. Further, it is also recognized that one or more of the subsystems or functions illustrated in the example of FIG. 11 may be further subdivided, or two or more of the features or functions illustrated in FIG. 11 may be combined.

Further referring to FIG. 11, the processor 1105 may utilize memory 1110 to store program execution instructions and data. Memory 1110 may be integrated into the processor 1105 itself, may reside in a separate package interconnected using a system bus, or a combination of the two. Program instructions stored by memory 1110 for execution by processor 1105 may include a position determination module 1115, a composite acceleration calibration module 1120, and an IMU correction module 1125. The composite acceleration calibration module 1120 utilizes inputs provided by accelerometer 1130, wheel speed sensors 1140, and optionally reference position determination system 1135 to generate calibration information which may be used to correct subsequent data provided by the IMU (not shown) within the vehicle INS 1145. Corrections may be applied in IMU correction module 1125. Details explaining this functionality will be provided in subsequent portions of this disclosure.

The position determination module 1115 may receive inputs from a variety of positioning subsystems to provide the most accurate position solution in all driving situations. In one embodiment, the position determination module 1115 may blend inputs from the reference position determination system 1135 and the compensated wheel speed sensor data. As will be described in more detail below, the reference position determination system 1135 may be Satellite Position System (SPS) based. When SPS positioning signals are unavailable (due to, for example, obstructions in dense urban environments), DR positioning may be employed to fill in for SPS coverage gaps. Compensation of the IMU data by the IMU correction module 1125 prior to use by the position determination module 1115 can improve the accuracy when DR positioning is being employed.

Further referring to FIG. 11, accelerometer 1130 can any type of conventional accelerometer which can measure at least two axes of acceleration. The accelerometer may be a dedicated unit, or an existing unit that may be used in the vehicle for other functionality. For example, accelerometers may be commonly found in stability control systems, and these may be used as the primary accelerometer, or in combination with an existing primary accelerometer 1130 to improve acceleration accuracy.

As mentioned earlier, the accelerations measured by accelerometer 1130 are composite accelerations having both inertial and gravitational components. As shown in FIG. 12A, the accelerometer 1130 may be mounted in the suspended portion of the vehicle 105, and should be oriented so that it can independently measure both forward acceleration ($\vec{\alpha}_{for}$) and lateral acceleration ($\vec{a}_{lat}$) as shown in FIG. 12B. For IMU calibration, the accelerometer 1130 should be located on the same (suspended or non-suspended) vehicle frame on which the navigation system sensors (e.g., IMU 1145) are placed, because the accelerometer is to measure and calibrate the navigation sensors alignment. It should be noted that the accelerometer placement issue will be moot when the navigation system itself contains an accelerometer, because in such a case the same accelerometer may also be used for the body alignment calibration.

Further referring to FIG. 11, WSS calibration and correction system 1100 may include Wheel Speed Sensors 1140 which may provide a signal to the processor 1105 indicative of wheel speed and/or wheel revolution counts (such as, for example, in wheel tick sensors). As shown in FIG. 12A, rear wheel speed sensors 1140 may be used to provide independent data regarding each rear tire, so that processor 1105 may calculate both distance traveled and turn angle for use in DR positioning. Moreover, front wheel speed sensors 1150 may also be used in place of real wheel sensors 1140, or in addition thereto. Each wheel speed sensor may be any type of known sensor that can directly measure wheel speed (e.g., reluctance/magnetic flux sensors) and/or provide a rotation counter value (e.g., Hall Effect sensors). As will be presented in detail below, the accuracy of information derived from the wheel speed sensors can adversely affected by unknown variations in wheel radii. Specifically, the errors may be proportional to changes in tire radius (delta tire radius, and thus to the traveled distance. These errors may be compensated for using the following techniques presented below.

Figure 13:
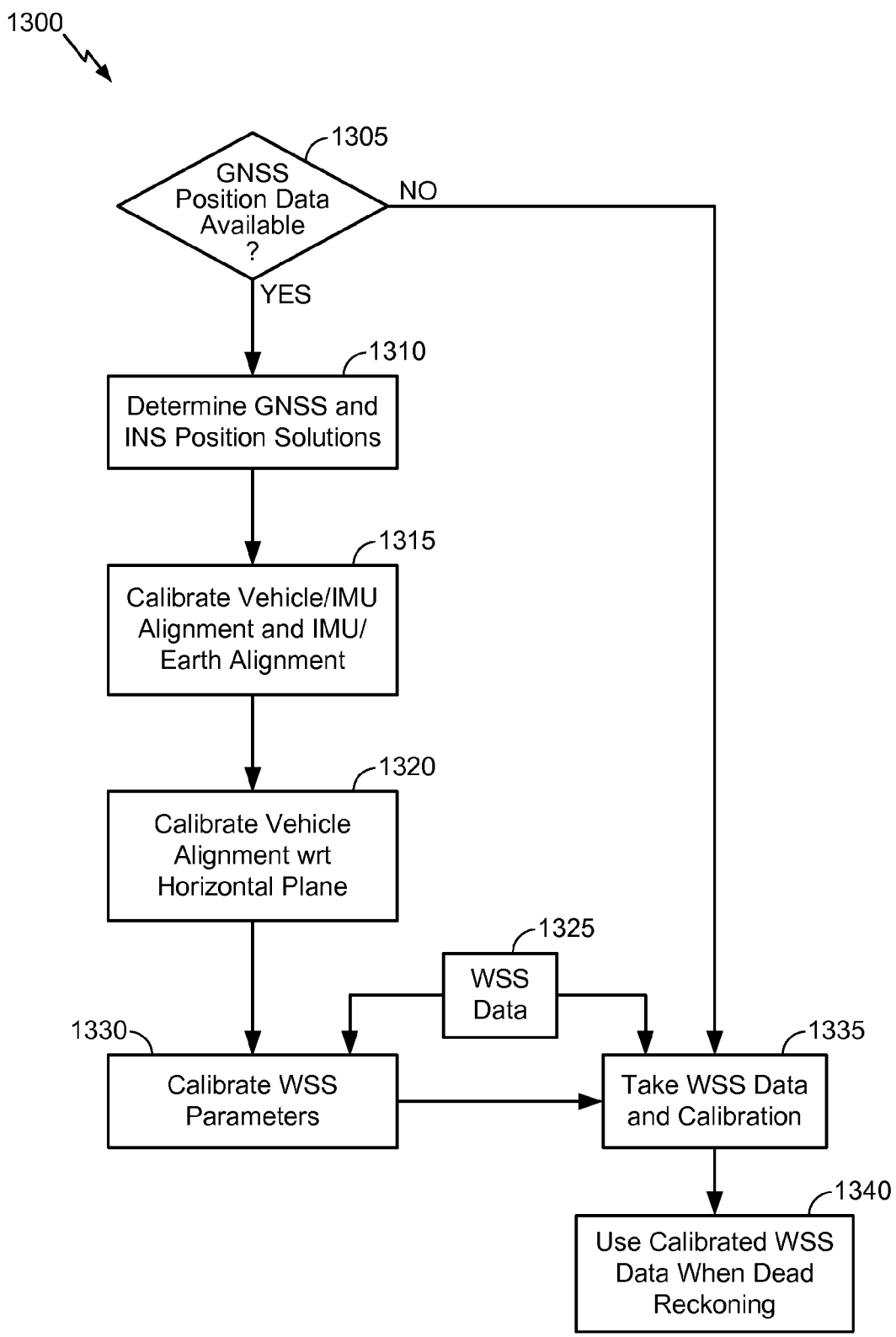
FIG. 13 is a flowchart illustrating an exemplary IMU calibration/correction process.

FIG. 13 is a flowchart illustrating an exemplary IMU calibration/correction process 1300. Initially, it is determined whether GNSS data is available (1305). If so, position solutions are generated using both the GNSS and the INS (1310). The vehicle reference frame may then be aligned to the IMU, and the IMU may be aligned to the Earth (1315). The vehicle alignment may then be aligned with respect to a horizontal plane (1320). Using WSS data (1325), the WSS may be calibrated using the aforementioned method illustrated in FIG. 9 (1330). The calibrated WSS data may then be used during DR positioning (1335 and 1340).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. As used herein, "non-transitory" computer readable media excludes only the interpretation that the computer readable medium can be construed as a transitory propagating signal. Non-transitory computer readable media does not exclude storage media having elements that can undergo transitions (e.g., semiconductor media, magnetic media, etc.).

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Accordingly, an embodiment can include a non-transitory computer readable media embodying a method for calibrating distance sensors within a vehicle navigation system. The method may include determining that reference position data of a vehicle is available, measuring composite accelerations of the vehicle, generating distance and turn angle data based upon a wheel speed sensors data, computing distance and turn angle errors based upon the independent position data, and associating the distance and turn angle errors with composite accelerations.

Accordingly, the invention is not limited to illustrated examples and any means for performing the functionality described herein are included in embodiments of the disclosure.

While the foregoing disclosure shows illustrative embodiments, it should be noted that various changes and modifications could be made herein without departing from the scope of the invention as defined by the appended claims. The functions, steps and/or actions of the method claims in accordance with the embodiments described herein need not be performed in any particular order. Furthermore, although elements of the invention may be described or claimed in the singular, the plural is contemplated unless limitation to the singular is explicitly stated.

What is claimed is:

1. A method for calibrating distance sensors within a vehicle navigation system, comprising:
   determining that reference position data of a vehicle is available;
   measuring composite accelerations of the vehicle;
   generating distance and turn angle data based upon wheel speed sensors data;
   computing distance and turn angle errors by a processor based upon the distance and turn angle data and reference position data; approximating a relationship between the distance errors and the composite accelerations with a first mathematical function;
   approximating a relationship between the turn angle errors and the composite accelerations with a second mathematical function; and
   associating the distance and turn angle errors with composite accelerations.

2. The method of claim 1, further comprising:
   determining that the composite accelerations are substantially constant.

3. The method of claim 1, wherein the associating further comprises:
   storing the distance and turn angle errors in look-up tables; and
   indexing the look-up tables with the composite accelerations.

4. The method of claim 1, wherein the first mathematical function and the second mathematical function are linear functions.

5. The method of claim 1, wherein the composite accelerations include composite forward acceleration and composite lateral acceleration.

6. The method of claim 5, further comprising
   associating the distance error with the composite forward acceleration; and
   associating the turn angle error with the composite lateral acceleration.

7. The method of claim 1, wherein the distance sensors are wheel speed sensors, and the reference position data is satellite position system data.

8. The method of claim 1, further including applying corrections to the distance sensor data, comprising:
   determining distance and turn angle data using the wheel speed sensors;
   measuring composite forward and lateral accelerations;
   determining that calibration data is available;
   determining distance and turn angle corrections based upon measured composite accelerations; and
   applying distance and turn angle corrections to the distance and turn angle data.

9. An apparatus for calibrating a distance sensor within a vehicle navigation system, comprising:
   an accelerometer;
   a reference position determination system;
   at least two wheel speed sensors;
   a processor coupled to the accelerometer, the wheel speed sensors, and the reference position determination system; and
   a memory coupled to the processor, wherein the memory stores instructions causing the processor to
      receive measured composite accelerations of the vehicle from the accelerometer,
      determine when the composite accelerations are substantially constant,
      compute distance and turn angle data based upon the wheel speed sensors,
      computing distance and turn angle errors based upon the distance and turn angle data and data provided by the reference position determination system,
      receive composite accelerations from the accelerometer,
      approximate a relationship between the distance errors and the composite accelerations with a first mathematical function,
      approximate a relationship between the turn angle errors and the composite accelerations with a second mathematical function, and
      associate the distance and turn angle errors with the composite accelerations.

10. The apparatus of claim 9, wherein the reference position determination system is a Satellite Position System (SPS) and/or a map matching system.

11. The apparatus of claim 10, wherein the accelerometer, the SPS, the processor, and the memory reside within a mobile device.

12. The apparatus of claim 9, wherein the at least two wheel speed sensors are tick sensors.

13. The apparatus of claim 9, wherein the memory stores instructions further causing the processor to
   store the distance and turn angle errors in look-up tables, and
   index the look-up tables with the composite accelerations.

14. The apparatus of claim 9, wherein the first mathematical function and the second mathematical function are linear functions.

15. The apparatus of claim 9, wherein the composite accelerations include composite forward acceleration and composite lateral acceleration.

16. The apparatus of claim 15, wherein the memory stores instructions further causing the processor to
associate the distance error with the composite forward acceleration; and
associate the turn angle error with the composite lateral acceleration.

17. The apparatus of claim 9, wherein the memory stores instructions further causing the processor to
receive distance data from the wheel speed sensors;
receive composite forward and lateral accelerations from the accelerometer;
determine that calibration data is available;
determine distance and turn angle corrections based upon measured composite accelerations; and
apply distance and turn angle corrections to the distance sensor data.

18. An apparatus for calibrating a distance sensor within a vehicle navigation system, comprising:
means for determining that reference position data of a vehicle is available;
means for measuring composite accelerations of the vehicle;
means for generating distance and turn angle data based upon wheel speed sensors data;
means for computing distance and turn angle errors based upon the distance and turn angle data and the reference position data; means for approximating a relationship between the distance errors and the composite accelerations with a first mathematical function;
means for approximating a relationship between the turn angle errors and the composite accelerations with a second mathematical function; and
means for associating the distance and turn angle errors with composite accelerations.

19. The apparatus of claim 18, wherein the means for associating further comprises:
means for storing the distance and turn angle errors in look-up tables; and
means for indexing the look-up tables with the composite accelerations.

20. The apparatus of claim 18, wherein the composite accelerations include composite forward acceleration and composite lateral acceleration.

21. The apparatus of claim 20, further comprising
means for associating the distance error with the composite forward acceleration; and
means for associating the turn angle error with the composite lateral acceleration.

22. The apparatus of claim 18, comprising means for applying corrections to the distance sensor data, further comprising:
means for determining distance and turn angle data using the wheel speed sensors;
means for measuring composite forward and lateral accelerations;
means for determining that calibration data is available;
means for determining distance and turn angle corrections based upon measured composite accelerations; and
means for applying distance and turn angle corrections to the distance and turn angle data.

23. A non-transitory machine-readable medium comprising instructions, which, when executed by a machine, cause the machine to perform operations, comprising:
instructions to determine that reference position data of a vehicle is available;
instructions to measure composite accelerations of the vehicle;
instructions to generate distance and turn angle data based upon wheel speed sensors data;
instructions to compute distance and turn angle errors based upon the distance and turn angle data and the reference position data; instructions to approximate a relationship between the distance errors and the composite acceleration with a first mathematical function;
instructions to approximate a relationship between the turn angle errors and the composite acceleration with a second mathematical function; and
instructions to associate the distance and turn angle errors with composite accelerations.

24. The non-transitory machine-readable medium of claim 23, wherein the instructions to associate further comprise:
instructions to store the distance and turn angle errors in look-up tables; and
instructions to index the look-up tables with the composite accelerations.

25. The non-transitory machine-readable medium of claim 23, further including instructions to apply corrections to the distance sensor data, comprising:
instructions to determine distance and turn angle data using the wheel speed sensors;
instructions to measure composite forward and lateral accelerations;
instructions to determine that calibration data is available;
instructions to determine distance and turn angle corrections based upon measured composite accelerations; and
instructions to apply distance and turn angle corrections to the distance and turn angle data.

* * * * *